United States Patent
Nelson

(10) Patent No.: US 7,787,774 B2
(45) Date of Patent: Aug. 31, 2010

(54) AUTHENTICATION MODES FOR AN OPTICAL TRANSCEIVER MODULE

(75) Inventor: Stephen T. Nelson, Santa Clara, CA (US)

(73) Assignee: Finisar Corporation, Sunnyvale, CA (US)

( * ) Notice: Subject to any disclaimer, the term of this patent is extended or adjusted under 35 U.S.C. 154(b) by 984 days.

(21) Appl. No.: 11/531,240

(22) Filed: Sep. 12, 2006

(65) Prior Publication Data

US 2007/0092258 A1    Apr. 26, 2007

Related U.S. Application Data

(60) Provisional application No. 60/716,116, filed on Sep. 12, 2005.

(51) Int. Cl.
*H04B 10/00* (2006.01)
(52) U.S. Cl. .......................... 398/135; 398/71; 398/72
(58) Field of Classification Search ......... 398/135–139, 398/70–72, 164–165
See application file for complete search history.

(56) References Cited

U.S. PATENT DOCUMENTS

| | | | |
|---|---|---|---|
| 2004/0008996 A1* | 1/2004 | Aronson et al. | 398/202 |
| 2005/0031352 A1* | 2/2005 | Light et al. | 398/135 |
| 2006/0069905 A1* | 3/2006 | Moriwaki et al. | 713/1 |

* cited by examiner

*Primary Examiner*—Dzung D Tran
(74) *Attorney, Agent, or Firm*—Workman Nydegger

(57) ABSTRACT

An optical transceiver module, having the ability to authenticate itself to a host is disclosed. The transceiver comprises a receive signal line for transferring data from the transceiver to the host and a transmit signal line for transferring data from the host to the transceiver in preparation for transmission to a communications network. The transceiver includes a controller having a processor in communication with the host, and a first memory register assignable by the processor. A consolidated laser driver/post amplifier is also included and features a pattern generator and a data switch. The pattern generator produces a string of bit values that serve as an authenticating data portion. The data switch selectively inputs the authenticating data portion to the receive signal line of the transceiver according to the state of the first memory register, enabling the authenticating data portion to be received by the host, thereby authenticating the transceiver.

18 Claims, 8 Drawing Sheets

AUTHENTICATION MODES FOR AN OPTICAL TRANSCEIVER MODULE

CROSS-REFERENCE TO RELATED APPLICATIONS

This application claims the benefit of the U.S. Provisional Patent Application No. 60/716,116, filed Sep. 12, 2005, and entitled "Authentication Modes for an Optical Transceiver Module," which is incorporated herein by reference in its entirety.

BACKGROUND

1. Technology Field

The present invention generally relates to optical transceiver modules. More particularly, the present invention relates to a device and method for validating the authenticity of an optical transceiver module via intentional manipulation of a high-speed data path carried by the transceiver while operably connected to a host system.

2. The Related Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from modest Local Area Networks ("LANs") to backbones that define a large portion of the infrastructure of the Internet.

Typically, data transmission in such networks is implemented by way of an optical transmitter (also referred to as an "optoelectronic transducer"), such as a laser or Light Emitting Diode ("LED"). The optoelectronic transducer emits light when current is passed through it, the intensity of the emitted light being a function of the magnitude of the current. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g. referred to as a "laser driver" when used to drive a laser signal) configured to control the operation of the optical transmitter in response to various control inputs. The optical transceiver also generally includes an amplifier (e.g. often referred to as a "post-amplifier") configured to amplify the channel-attenuated received signal prior to further processing. A controller circuit (hereinafter referred to as the "controller") controls the operation of the laser driver and post-amplifier.

One challenge that is increasingly encountered involves the authenticity of optical transceivers used in connection with optical networking devices. For instance, manufacturers and users of optical networking devices that employ optical transceivers—such as routers, switches, and the like—often desire that only authentic transceivers originating from a reliable manufacturer be used in their devices.

Unfortunately, knock-off transceivers of unknown or spurious origin can infiltrate the transceiver market such that they are employed in optical networking devices. Such optical transceivers can be of inferior quality or be configured contrary to what is needed or desired. As a result, operation of the optical networking device itself can be compromised.

In light of the above, a need exists in the art for a means by which the identity of optical transceivers and other communications modules can be authenticated so as to prevent unknown or counterfeit devices from being employed in critical optical networking applications.

BRIEF SUMMARY

The present invention has been developed in response to the above and other needs in the art. Briefly summarized, embodiments of the present invention are directed to a communications module, such as an optical transceiver module, having the ability to authenticate itself to a host system or other component to which the transceiver module is attached is disclosed. This allows the host system to validate the transceiver as an authentic device from an identified source, such as a particular vendor, thereby allowing other, invalidated transceivers to be identified.

In one embodiment, an optical transceiver module having such an authentication system is disclosed. The optical transceiver module comprises a receive signal line for transferring data from the transceiver to a host device and a transmit signal line for transferring data from the host device to the transceiver in preparation for transmission to a communications network. The transceiver includes a controller having a processor in operable communication with the host, and a first memory register that is assignable by the processor. A consolidated laser driver/post amplifier is also included and features a pattern generator, and a data switch. The pattern generator produces a string of bit values that serve as an authenticating data portion. The data switch selectively inputs the authenticating data portion to the receive signal line of the transceiver according to the state of the first memory register, enabling the authentication data portion to be received by the host device to authenticate the transceiver module with the host device.

In another example embodiment, the pattern generator can produce a changeable pattern as the authenticating data portion, wherein the changeable pattern is assignable by the transceiver controller or the host device. In yet another example embodiment, the authenticating data portion can be composed of a portion of the transmit data stream carried by the transmit signal line of the transceiver. In this case, the portion of the transmit data stream is "looped" from the transmit signal line to the receive signal line by a loopback switch. Also, the portion of the transmit data stream can be reversed in polarity either before or after loopback, thereby further inhibiting knock-off transceivers from imitating authentic devices.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SELECTED EMBODIMENTS

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

FIGS. 1-5 depict various features of embodiments of the present invention, which is generally directed to an optical transceiver module ("transceiver") having the ability to authenticate itself to a host system or other component to which the transceiver module is attached. This allows the host system to validate the transceiver as an authentic transceiver from an identified source, such as a particular vendor, thereby allowing other, invalidated transceivers to be identified. Embodiments of the present invention further enable for simple identification of a transceiver to be made when such identification is desired.

Figure 1:
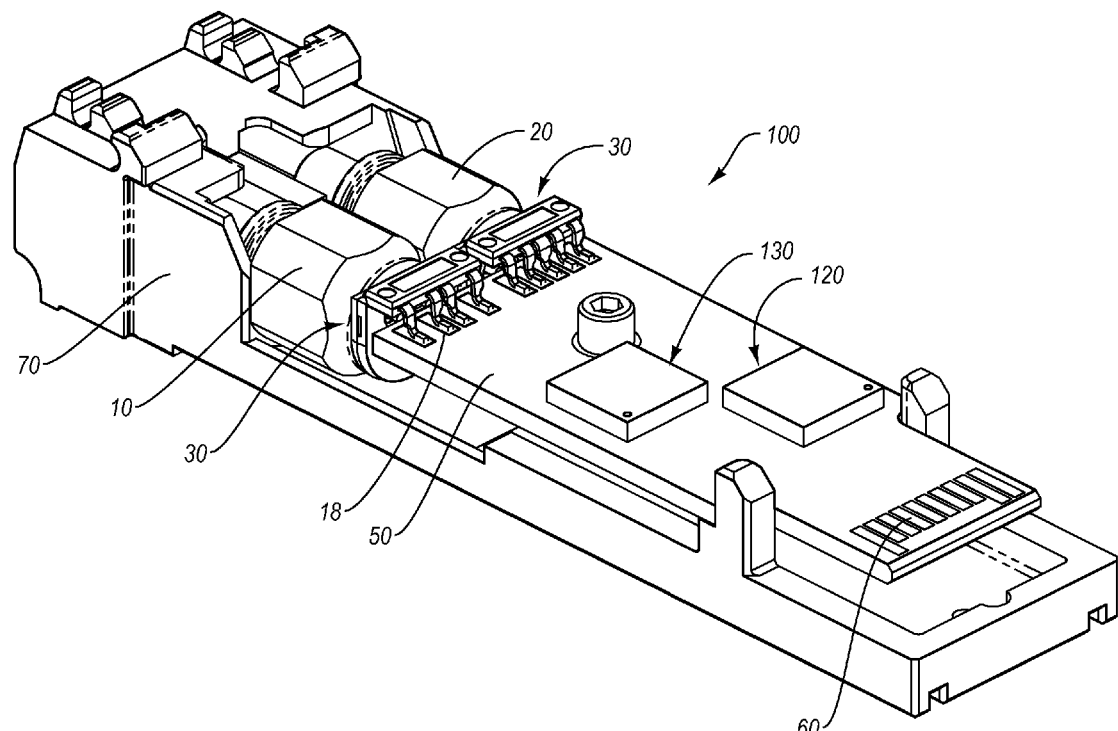
FIG. 1 is a perspective view of an optical transceiver module including various components that are employed in connection with one exemplary embodiment of the present invention.

Reference is first made to FIG. 1, which depicts a perspective view of an optical transceiver module ("transceiver"), generally designated at 100, for use in transmitting and receiving optical signals in connection with an external host that is operatively connected in one embodiment to a communications network (not shown). As depicted, the transceiver shown in FIG. 1 includes various components, including a receiver optical subassembly ("ROSA") 10, a transmitter optical subassembly ("TOSA") 20, lead frame connectors 30, an integrated circuit controller 120, an integrated circuit laser driver/post amplifier ("LDPA") 130, and a printed circuit board 50. In detail, two lead frame connectors 30 are included in the transceiver 100, one each used to electrically connect the ROSA 10 and the TOSA 20 to a plurality of conductive pads 18 located on the PCB 50. The controller 120 and LDPA 130 are also operably attached to the PCB 50. An edge connector 60 is located on an end of the PCB 50 to enable the transceiver 100 to electrically interface with a host (not shown here). As such, the PCB 50 facilitates electrical communication between the ROSA 10/TOSA 20, and the host. In addition, the above-mentioned components of the transceiver 100 are partially housed within a housing portion 70. Though not shown, a shell can cooperate with the housing portion 70 to define a covering for the components of the transceiver 100.

Figure 2A:
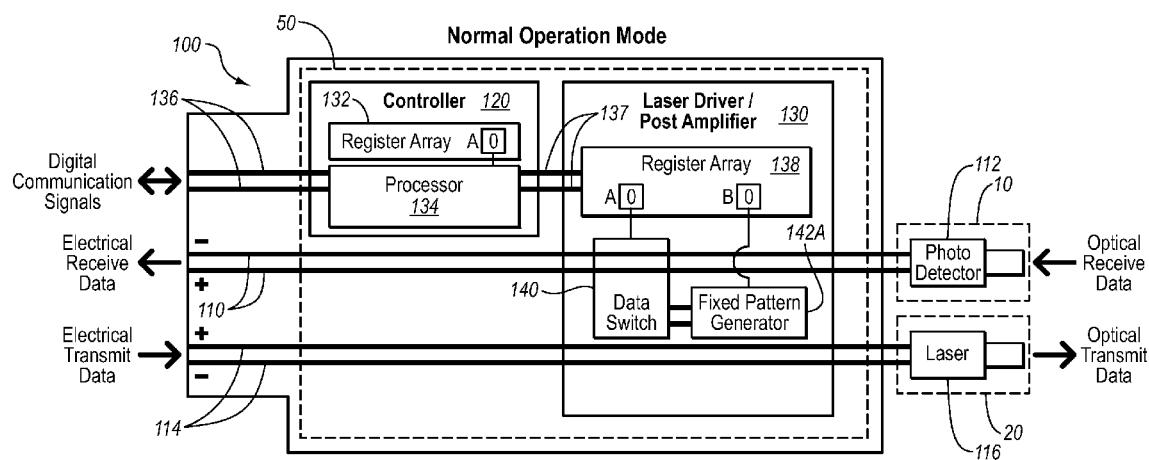
FIG. 2A is a simplified block diagram showing the optical transceiver module of FIG. 1 in a normal operational mode according to one embodiment.
Figure 2B:
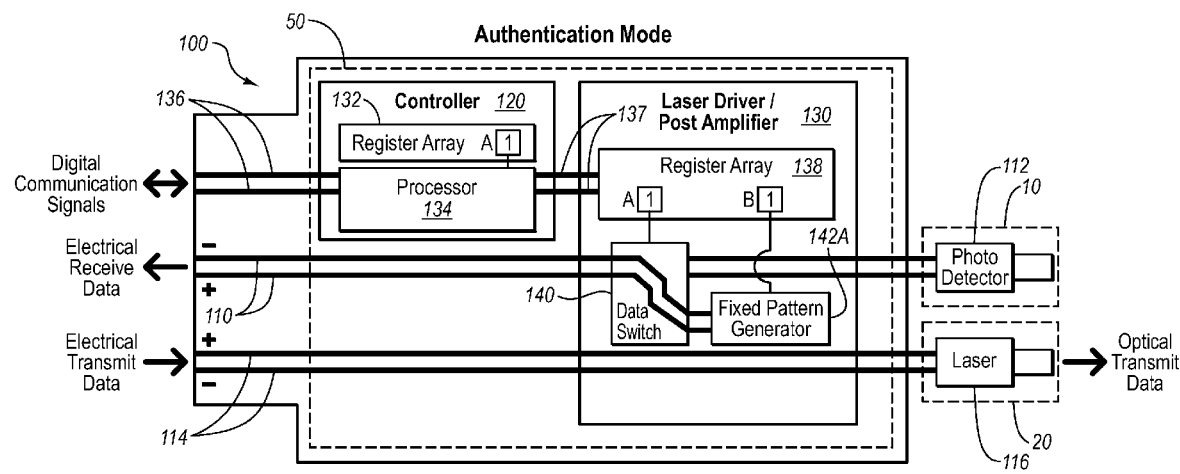
FIG. 2B is a simplified block diagram showing the optical transceiver module of FIG. 2A in an authentication operational mode.

Reference is now made to FIGS. 2A and 2B, which collectively illustrate various features of the present invention, according to one embodiment. As mentioned, embodiments of the present invention are directed to a transceiver configured to enable its authentication for a host system (not shown here) or other component to which it is operably attached, and a method for such authentication to be performed. Note that, while the optical transceiver 100 will be described in some detail, the optical transceiver 100 is described by way of illustration only, and not by way of restricting the scope of the invention. As mentioned above, the optical transceiver 100 in one embodiment is suitable for optical signal transmission and reception at a variety of per-second data rates, including but not limited to 1 Gbit, 2 Gbit, 4 Gbit, 8 Gbit, 10 Gbit, or higher bandwidth fiber optic links. Furthermore, the principles of the present invention can be implemented in optical transceivers of any form factor such as XFP, SFP and SFF, without restriction.

In detail, FIG. 2A shows a simplified block diagram of various components of the Xtransceiver 100 of FIG. 1. During operation, the transceiver 100 can receive a data-carrying electrical signal from the host, which can be any computing system capable of communicating with the optical transceiver 100, for transmission as a data-carrying optical signal on to an optical fiber (not shown). This electrical data signal that is supplied to the transceiver 100 is carried via a pair of differential transmit signal lines 114, shown in FIG. 2A. Each signal line of the differential signal line pair carries one of two streams of differential electrical data that differ from each other only in signal polarity. As such, the lines are respectively indicated with a "+" or a "−" indicator, indicating the respective positive or negative polarity of each line. The electrical differential data signal is provided to a light source, such as a laser 116 located in the TOSA 20, which converts the electrical signal into a data-carrying optical signal for emission on to an optical fiber and transmission via an optical communications network, for instance. The laser 116 can be an edge-emitting laser diode, a vertical cavity surface emitting laser ("VCSEL"), a distributed feedback ("DFB") laser, or other suitable light source. Accordingly, the TOSA 20 serves as an electro-optic transducer.

In addition, the transceiver 100 is configured to receive a data-carrying optical signal from an optical fiber via the ROSA 10. The ROSA 10 acts as an opto-electric transducer by transforming the received optical signal, via a photodetector 112 or other suitable device, into an electrical signal. The resulting electrical signal is carried via a pair of differential receive signal lines 110. As is the case with the differential transmit signal lines 114, each signal line of the differential receive signal lines 110 carries one of two streams of differential electrical data that differ from each other only in signal polarity. As such, the lines are respectively indicated with a "+" or a "−" indicator, indicating the respective positive or negative polarity of each line. Note that in other embodiments, non-differential signal lines can also be acceptably used with the present invention.

Electronic componentry is included on the PCB 50 of the transceiver 100 to assist in data signal transmission and reception. In the illustrated embodiment, a post amplifier for amplifying the electrical signal received from the photodetector 112 is consolidated with a laser driver for driving the laser 116 to comprise an integrated laser driver/post amplifier ("LDPA") 130. As such, the LDPA 130 resides on a single integrated circuit chip and is included as a component, together with the other electronic components, some of which are further described below, on the PCB 50 (FIG. 1). Further details regarding the integrated LDPA 130 can be found in U.S. patent application Ser. No. 10/970,529, entitled "Integrated Post Amplifier, Laser Driver, and Controller," filed Oct. 21, 2004 (the "'529 Application"), which is incorporated herein by reference in its entirety. In other embodiments, the post amplifier and laser driver can be included as separate components on the PCB 50.

The behavior of the ROSA 10, the LDPA 130, and the TOSA 20 may vary dynamically due to a number of factors. For example, temperature changes, power fluctuations, and feedback conditions may each affect the performance of these components. Accordingly, the transceiver 100 further includes a controller 120, which can evaluate conditions pertinent to transceiver operation, such as temperature or voltage, and receive information from the post-amplifier and laser driver portions of the LDPA 130. This in turn allows the controller 120 to optimize the dynamically varying performance of the transceiver 100. In one embodiment, the controller 120 can include both an analog portion and a digital portion that together allow the controller to implement logic digitally, while still largely interfacing with the rest of the optical transceiver 100 using analog signals. Also, though the controller 120 and LDPA 130 may be the same chip (as disclosed in the '529 Application), in the present embodiment the controller is included on the PCB 50 as a separate component from the LDPA.

In accordance with one embodiment of the present invention, the transceiver 100 is configured to provide authentication for use by a host to which the transceiver is operably connected. As such, in one embodiment the transceiver 100 includes various components designed to enable such authentication to occur. In particular, and as shown in FIG. 2A, the controller 120 includes a register array 132 and a processor 134 that is in communication with digital communication signals that are carried between the host and the processor via digital signal lines 136. In addition, the LDPA 130 includes a register array 138, a data switch 140, and a fixed pattern generator 142A. The register array 138 of the LDPA 130 is in digital communication with the processor 134 to enable specified communication between the controller 120 and the LDPA to occur. These components are described below in greater detail in connection with their use in authenticating the transceiver 100 for the host.

The controller 120 governs authentication activities within the transceiver 100. In one embodiment, this governance is implemented by the components described above. In greater detail, the register array 132 of the controller 120 includes an assignable memory location, "A-bit," as seen in FIG. 2A. The A-bit of the register array 132 is assignable by the processor 134. The processor 134 can assign the A-bit autonomously in accordance with its execution of microcode, or as directed by the host via the digital signal lines 136. In the present embodiment, the A-bit of the register array 132 can be toggled between a "0" and "1" logic bit value, wherein the logic "0" indicates normal operation mode, while a logic "1" indicates authentication mode, as will be explained further below. Note that the A-bit and other memory locations described herein can be larger than bit-sized, if desired or needed for a particular application, so as to be assigned any number of possible values.

Similar to the controller 120, the LDPA 130 also includes a register array, i.e., the register array 138. The register array 138 includes two assignable memory locations: an "A-bit" and a "B-bit," which can each be toggled between logic "0" and "1" values. The assignment of values to these bits is governed by the processor 134, made possible by its connection with the register array 138 via digital signal lines 137. The A-bit and B-bit in turn are operably connected to the data switch 140 and fixed pattern generator 142A, respectively, of the LDPA 130. The value assigned to each of the A-bit and the B-bit respectively determines the functionality of the data switch 140 and fixed pattern generator 142A in authenticating the transceiver 100, as explained further below.

As shown in FIG. 2A, the data switch 140 and fixed pattern generator 142A are in operable communication with one another. This is to enable a digital bit pattern, composed of a series of logical bit values and produced by the fixed pattern generator 142A, to be forwarded to the data switch for placement in the data stream of the differential receive signal lines 110 and serve as an authenticating data portion for authenticating the transceiver 100, as will be explained.

As has been already mentioned, the transceiver 100 can operate in at least two modes, as shown in FIGS. 2A and 2B: a normal operation mode where the transceiver operates in usual fashion to transmit and receive optical data signals, and an authentication mode where the transceiver validates itself with respect to a host system or other component to which it is operably connected.

As seen in FIG. 2A, in normal mode operation the transceiver 100 transmits data from the host via the differential transmit signal lines 114 to the laser 116 of the TOSA 20 for conversion to optical data signals and emission via an optical fiber (not shown). Simultaneously, the transceiver 100 receives optical signal data from an optical fiber (not shown) operably connected to the photodetector 112 of the ROSA 10, which data is converted to an electrical data signal by the photodetector before being forwarded to the host via the differential receive signal lines 110. In this normal operation mode, the A-bit of the register array 132 and the A- and B-bits of the register array 138 are set to logical "0," indicating that the authentication procedures and components are dormant. Note that the particular logical value assigned to the bits is not important; as such, other values could be used to indicate normal/authentication modes.

In response to autonomous processing, or by direction issued by the host, the processor can assign a logical "1" value to the A-bit of the register array 132 of the controller 120. This causes the transceiver 100 to switch into authentication mode, as seen in FIG. 2B. Once the A-bit of the register array 132 is changed to a "1" value to indicate authentication mode, the processor communicates with the register array 138 of the LDPA 130 and assigns logical "1" values to the A- and B-bits, thereby activating the authentication mode in the LDPA 130 and activating the data switch 140 and fixed pattern generator 142A, respectively.

Activation of the fixed pattern generator 142A causes it to create an authenticating data portion composed of a digital stream of bit values in a fixed pattern that are continuously forwarded to the data switch 140. At or about the same time, activation of the data switch 140, which is placed in-line with the differential receive signal lines 110, causes interruption, if necessary, of the data stream from the photodetector 112. Instead, the data switch 140 inserts into the differential receive signal lines 110 the fixed pattern stream received from the fixed pattern generator 142A. The fixed pattern stream then proceeds via the signal lines and is received by the host.

Receipt of the fixed pattern stream by the host enables the host to verify that the transceiver 100 is a valid transceiver for use with the host. Non-receipt of the fixed pattern stream by the host, on the other hand, can indicate a problem condition existing with an otherwise valid transceiver, or the presence of a non-authenticated (invalid) transceiver. In either case, corrective or appropriate action can be taken by the host, including deactivation of the transceiver, the sending of an alert, etc. The fixed pattern stream can be pre-defined between the host device and the transceiver, i.e., the host manufacturing company and the transceiver manufacturing company, such that the transceiver will be recognizable by the host device upon receipt therein. Alternatively, the fixed pattern stream can be defined by the transceiver manufacturing company and the controller of the transceiver can inform the host device of the particular pattern of the fixed pattern stream being used when the transceiver is received by and connected to the host device.

When authentication is no longer needed or desired, the processor 134—either by instruction from the host or by autonomous decision—changes the A-bit of the register array 132 to logical "0," indicating a return to normal transceiver mode. The processor can then re-assign the A- and B-bits of the register array 138 of the LDPA 130 to logical "0"'s, causing the fixed pattern generator 142A to cease production of the fixed pattern stream and the data switch 140 to re-establish the link between the photodetector 112 and the host via the differential receive signal lines 110.

Figure 3A:
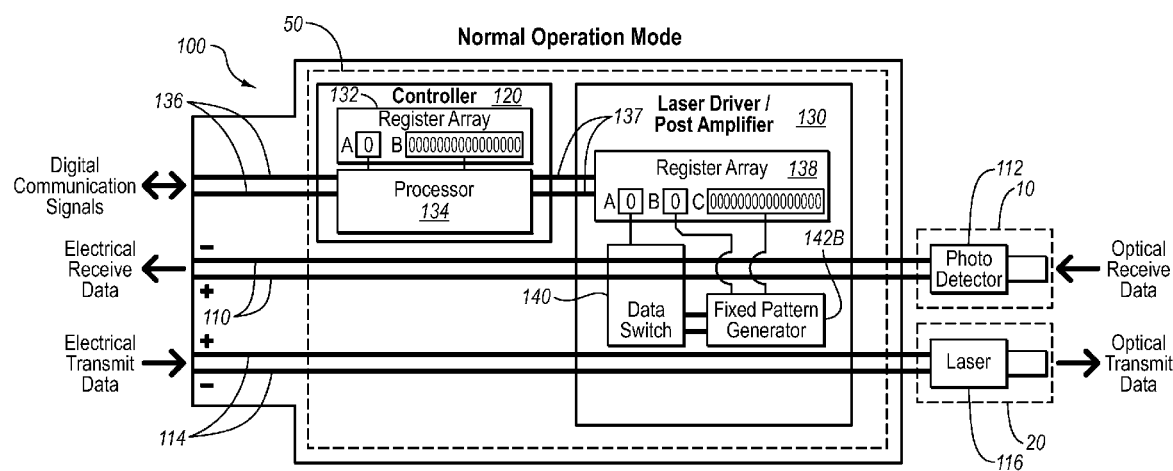
FIG. 3A is a simplified block diagram showing the optical transceiver module of FIG. 1 in a normal operational mode according to another embodiment.
Figure 3B:
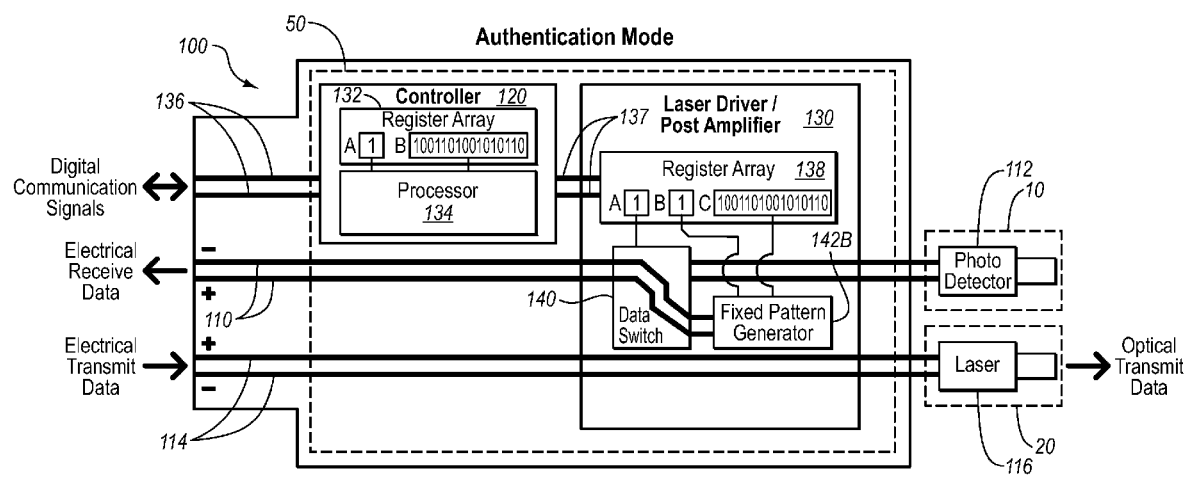
FIG. 3B is a simplified block diagram showing the optical transceiver module of FIG. 3A in an authentication operational mode.

Reference is now made to FIGS. 3A and 3B, which describe various features of a transceiver having authentication functionality, according to another embodiment of the present invention. Note that the transceivers to be described in connection with FIGS. 3A and 3B and subsequent figures are alike in many respects to the transceiver shown in FIGS. 2A and 2B. As such, only selected features of the transceiver shown in FIGS. 3A and 3B will be discussed here.

As shown in FIG. 3A, the transceiver 100 here differs from that shown in FIG. 2A in various aspects. The register array 132 of the controller 120 now includes 2 assignable memory locations: an A-bit and a B-register. As before, the A-bit is toggled by the processor 134 between logical "1" and "0" values to indicate activation/non-activation of the transceiver authentication mode, respectively. The B-register is assignable by the processor 134 to include a string of bit values in a particular pattern to be transmitted by a pattern generator, described below. The pattern string assigned to the B-register can be forwarded to the host for use in authenticating the transceiver, as discussed below. Alternatively, the pattern of the bit string can be dictated by the host and forwarded to the controller 120. In yet another embodiment, the generator itself can dictate the contents and pattern of the bit string, then share the information with the controller and/or host.

The register array 138 of the LDPA 130 includes three assignable memory locations in the present embodiment: as before the register array includes the A-bit for use in activating the data switch 140 and the B-bit for activating a pattern generator. In contrast to FIG. 2A, however, the pattern generator is a changeable pattern generator 142B that is capable of producing a plurality of bit string patterns for use in authenticating the transceiver 100. The particular bit pattern produced by the changeable pattern generator 142B is stored in a C-register of the register array 138.

As shown in FIG. 3A, during normal operation mode of the transceiver 100 the A-bit of the register array 132 is set to "0," indicating normal mode, and the B-register value is nil. Likewise, the A-bit and B-bit are set to "0" by the processor 134, and the C-register, having received nothing from the changeable pattern generator in its inactive state (given the "0" status of the B-bit), is nil.

In FIG. 3B, the authentication mode of the transceiver 100 is shown in an active state. In detail, the A-bit of the register array 132 is assigned a "1" value by the processor, indicating authentication activation. The processor also assigns "1" values to the A- and B-bits of the register array 138, thereby activating the data switch 140 and the changeable pattern generator 142B. Activation of the generator 142B causes it to produce an authentication data portion composed of a bit string, seen in FIG. 3B, which is forwarded to the data switch 140. As before, the data switch injects the bit string on the differential receive signal lines 110 for receipt by the host.

The bit string produced by the changeable pattern generator in FIG. 3B can periodically change during authentication mode, change each time authentication mode is accessed, or change according to processor or host instructions. Moreover, the composition of the pattern stream can be dictated by the host via instructions to the processor via the digital signal lines 136, or by the processor itself, in one embodiment. As before, the bit stream is used to validate the transceiver. Once such validation is no longer needed or desired, the system can return to the state shown in FIG. 3A.

Note that in one embodiment of the present invention, the value stored in the C-register of the register array 138, which serves as the authentication data portion and is shared between the host, controller and/or generator as explained above, can be identical to a portion of the data stream received by the host via the differential receive signal lines 110. In another embodiment, the value stored in the C-register can be an encryption key or an identifier of several preset patterns. These encryption keys and identifiers can be employed alone, or in combination with a portion of the data stream received by the host via the differential receive signal lines 110 as part of an algorithm known by the host device and/or controller to form an authenticating data portion for use in the authentication process.

Figure 4A:
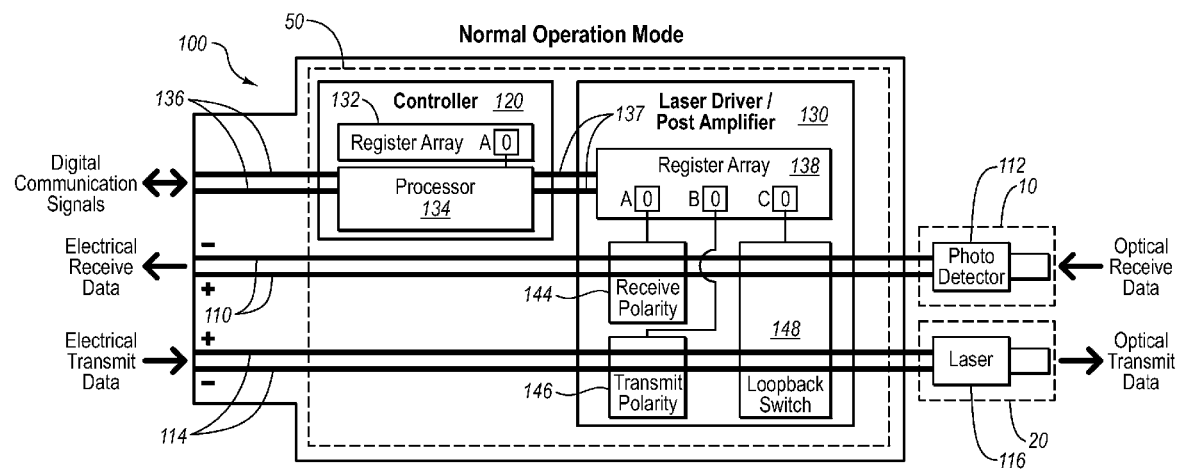
FIG. 4A is a simplified block diagram showing the optical transceiver module of FIG. 1 in a normal operational mode according to yet another embodiment of the present invention.
Figure 4B:
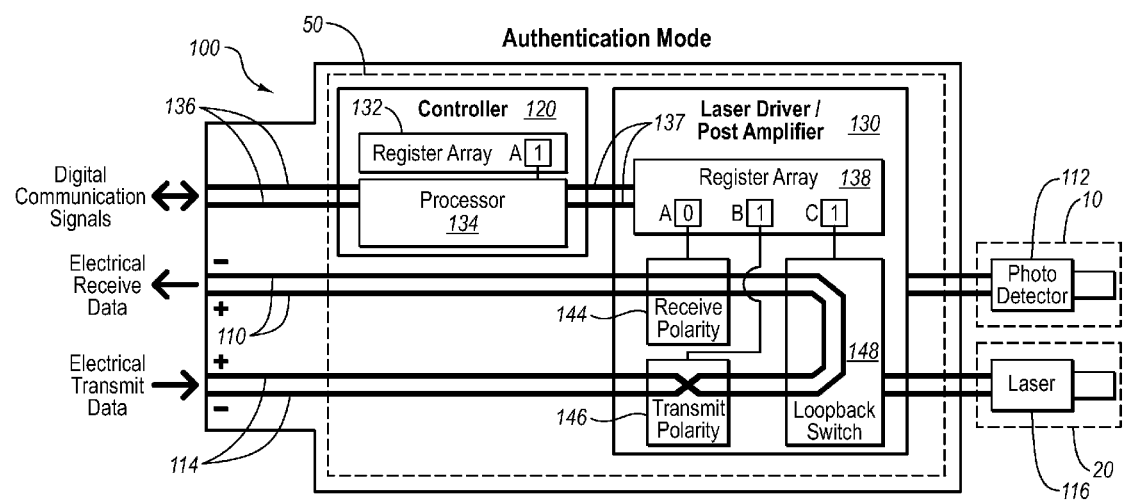
FIG. 4B is a simplified block diagram showing the optical transceiver module of FIG. 4A in an authentication operational mode.

Reference is now made to FIGS. 4A and 4B, describing yet another embodiment of an authentication system for a transceiver. As in the embodiment described in connection with FIGS. 2A-2B, the controller 120 includes the register array 132 having an assignable A-bit, and the processor 134. The register array 138 of the LDPA 130 includes an A-bit, a B-bit, and a C-bit. The A-bit of the register array 138 governs activation of a receive polarity inverter 144, the B-bit governs a transmit polarity inverter 146, and the C-bit governs a loopback switch 148.

During normal operation mode, the optical signals are transmitted and received, as described earlier. However, when authentication mode is desired, the processor 134 sets the A-bit in the register array 132 to a logical "1." One of the A-bit and the B-bit is set to "1" to activate either the receive polarity inverter 144 or the transmit polarity inverter 146. Each of the polarity inverters 144, 146 are configured to invert the differential data signals that are carried by the differential receive or transmit signal lines 110 and 112. For example, once inverted a negatively polarized data signal will be transmitted along the signal line commonly employed for transmitting positively polarized data signals. The inverse is true for positively polarized data signals that are inverted. Further details regarding polarity inversion of data signals can be found in U.S. application Ser. No. 11/386,589, entitled "Optical Transceiver Module Having Adjustable Signal Polarity," filed Mar. 22, 2006, which is incorporated herein by reference in its entirety.

In the present embodiment shown in FIG. 4B, the B-bit of the register array 138 is set to "1" by the processor 134 during authentication mode, thereby causing the transmit polarity inverter 146 to invert the differential data signals. In contrast, the A-bit remains at "0," precluding any signal inversion by the receive polarity inverter 144, though the reverse could be true in other circumstances. The processor 134 of the controller 120 decides in the present embodiment which polarity inverter will be employed.

The C-bit is also set to "1" in FIG. 4B. This activates the loopback switch 148, which loops the outgoing electrical transmit data signal from the differential transmit signal lines 114 to the differential receive signal lines, as shown in FIG. 4B. Thus the outgoing transmit data signal from the host, after polarity inversion, is looped back to the host via the differential receive signal lines 110. This looped-back and polarity-inverted transmit data signal thus serves as an authenticating data portion for authenticating the transceiver 100. Further details regarding the loopback of data signals in an optical transceiver can be found in U.S. application Ser. No. 11/260,448, entitled "Transceiver Based Loop Back Initiation," filed Oct. 27, 2005, which is incorporated herein by reference in its entirety. Upon receipt, the host can evaluate the data stream and ensure that the data received are the inverted copy of what was sent via the differential transmit signal lines 114. If not, the host is alerted to an issue of authentication or some other problem condition.

Figure 5:
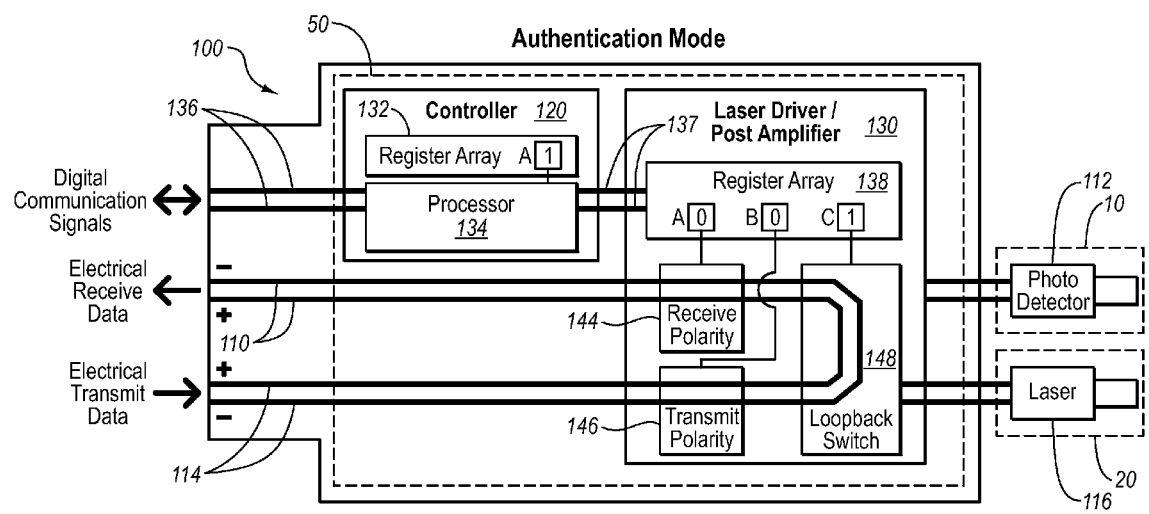
FIG. 5 is a simplified block diagram showing the optical transceiver module of FIG. 4A in a second authentication operational mode.

If desired, the authentication mode discussed above in connection with FIG. 4B can also be executed without implementing the polarity switching feature of the receive or transmit polarity switches 144 or 146. FIG. 5 illustrates such an embodiment, wherein the loopback switch 148 is activated by the C-bit of the register array 138 such that the electrical transmit signal is redirected back to the host along the receive signal lines 110. Thus, it is seen how authentication can be achieved in a number of ways via the present system.

In another embodiment of the present invention, combinations of the embodiments described above can be realized, such as a transceiver having the ability to generate a patterned bit stream that is then inverted before being looped back to the host. These and other embodiments are therefore contemplated.

Practice of embodiments of the present invention enables transceivers, such as those from a preferred source, to be authenticated. The authentication procedures carried out as explained above further prevent transceiver manufacturers from producing copycat transceivers designed to replace authentic modules.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A communications module capable of authentication by a host device in which the communications module is received, the communications module comprising:

at least one receive signal line for enabling optical signals received by the communications module to be transmitted to the host;

a first register array in operable communication with the receive signal line, the first register array including at least one assignable bit that is capable of directing an authenticating data portion to the host device via the at least one receive signal line, the authenticating data portion enabling the host to authenticate the communications module; and a second register array included in a controller of the communications module the second register array controlling the at least one assignable bit of the first register array.

2. The communications module as defined in claim 1, wherein the at least one receive signal line includes first and second differential signal lines that differ in polarity one from another, and wherein the authenticating data portion is a differential signal.

3. The communications module as defined in claim 1, wherein the first register array is at least indirectly controlled by the host device.

4. The communications module as defined in claim 1, wherein the first register array is included in a post amplifier portion of the communications module.

5. The communications module as defined in claim 1, wherein the authenticating data portion is produced by a pattern generator included in the communications module.

6. The communications module as defined in claim 5, wherein the controller includes a processor capable of executing microcode, and wherein the microcode, when executed, modifies the authenticating data portion produced by the pattern generator.

7. The communications Module as defined in claim 5, further including a data switch included in the communications module that selectively directs the authenticating data portion from the pattern generator to the at least one receive signal line.

8. The communications module as defined in claim 1, wherein the authenticating data portion is selected from one of the following: data identical to a portion of data represented by the optical signals received by the communications module to be transmitted to the host; an encryption key; an identifier according to at least one predetermined pattern; and any combination of the above employed as part of an algorithm.

9. A communications module capable of authentication by a host device in which the communications module is received, the communications module comprising:

at least one receive signal line for enabling optical signals received by the communications module to be transmitted to the host; and a first register array in operable communication with the receive signal line, the first register array including at least one assignable bit that is capable of directing an authenticating data portion to the host device via the at least one receive signal line, the authenticating data portion enabling the host to authenticate the communications module, wherein the authenticating data portion includes a portion of a data stream carried by a differential transmit signal line of the communications module, and wherein the portion of the data stream is transferred from the transmit signal line to the at least one receive signal line by a loopback switch included in the communications module.

10. The communications module as defined in claim 9, wherein the at least one receive signal line is a differential receive signal line, and wherein the polarity of the portion of the data stream is reversed by a polarity switch before receipt by the host device.

11. An optical transceiver module having an authentication system, the optical transceiver module comprising:
- a receive signal line for transferring data from the optical transceiver module to a host device in operable communication with the optical transceiver module;
- a controller including:
  - a processor in operable communication with a host; and
  - a first register assignable by the processor; and
- a consolidated laser driver/post amplifier including:
  - a pattern generator that produces a string of bit values that serve as an authenticating data portion;
  - a data switch that selectively inputs the authenticating data portion to the receive signal line when the first register of the controller is assigned a first value, the authentication data portion being received by the host device via the receive data path to authenticate the optical transceiver module with the host device; and
  - a second register having a location for storing a first bit that governs functionality of the data switch and a location for storing a second bit that governs functionality of the pattern generator.

12. The optical transceiver module as defined in claim 11, wherein authentication of the communications module enables continued operation of the optical transceiver module with the host device.

13. The optical transceiver module as defined in claim 12, wherein the first register further includes a location for storing a string of assignable bit values to serve as the authenticating data portion, and wherein the second register further includes a location for storing the string of assignable bit values to be used by the pattern generator in producing the authenticating data portion.

14. The optical transceiver module as defined in claim 11, wherein the authenticating data portion is continuously sent by the pattern generator while the first register of the controller is assigned the first value.

15. An optical transceiver module having an authentication system, the optical transceiver module comprising:
- a receive signal line for transferring differential receive data from the optical transceiver module to a host device in operable communication with the optical transceiver module;
- a transmit signal line for transferring differential transmit data from the host for optical transmission by the optical transceiver module;
- a controller including:
  - a processor in operable communication with a host; and
  - a first register assignable by the processor; and
- a consolidated laser driver/post amplifier including:
  - a loopback switch that selectively diverts a portion of the differential transmit data from the transmit signal line to the receive signal line when a first value is present in the first register, the portion of the differential transmit data serving as an authenticating data portion; and
  - a first polarity inverter that inverts the polarity of the authenticating data portion before receipt by the host device, wherein the authenticating data portion is used by the host device to authenticate the optical transceiver module.

16. The optical transceiver module as defined in claim 15, wherein without authentication the optical transceiver module is prevented from operating after a period of time.

17. The optical transceiver module as defined in claim 15, wherein the controller autonomously controls operation of the loopback switch and the first polarity inverter.

18. The optical transceiver module as defined in claim 15, wherein the first register of the controller includes a location for storing a bit value, and wherein the consolidated laser driver/post amplifier further includes:
- a second register having a location for storing a first bit value that governs functionality of the first polarity switch, a location for storing a second bit value that governs functionality of a second polarity switch, and a location for storing a third bit value that governs functionality of the loopback switch.

* * * * *